US 007653653B2

(12) United States Patent
Lefferts et al.

(10) Patent No.: US 7,653,653 B2
(45) Date of Patent: Jan. 26, 2010

(54) DYNAMICALLY CONFIGURABLE LISTS FOR INCLUDING MULTIPLE CONTENT TYPES

(75) Inventors: Robert G. Lefferts, Redmond, WA (US); Hai Liu, Sammamish, WA (US); Steven James Rayson, Seattle, WA (US); Andrew Sean Watson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 11/058,096

(22) Filed: Feb. 14, 2005

(65) Prior Publication Data

US 2006/0184507 A1    Aug. 17, 2006

(51) Int. Cl.
*G06F 17/00* (2006.01)

(52) U.S. Cl. .............................. 707/103 R; 707/104.1; 707/200; 707/8; 707/9; 707/10; 709/221; 709/223; 705/9

(58) Field of Classification Search ................. 707/103, 707/103 R, 104.1, 200, 8, 9, 10; 709/221, 709/223; 705/9
See application file for complete search history.

(56) References Cited

U.S. PATENT DOCUMENTS

| | | | | |
|---|---|---|---|---|
| 5,742,813 | A | 4/1998 | Kavanagh et al. ............... 707/8 |
| 5,794,030 | A | 8/1998 | Morsi et al. ............. 707/103 R |
| 5,842,223 | A * | 11/1998 | Bristor ........................ 707/204 |
| 5,893,107 | A * | 4/1999 | Chan et al. ............. 707/103 R |
| 5,913,063 | A | 6/1999 | McGurrin et al. ........... 717/109 |
| 5,920,725 | A | 7/1999 | Ma et al. ..................... 717/171 |
| 5,940,834 | A | 8/1999 | Pinard et al. ................ 707/102 |
| 5,956,736 | A | 9/1999 | Hanson et al. .............. 715/234 |
| 6,026,408 | A | 2/2000 | Srinivasan et al. ...... 707/103 R |
| 6,038,567 | A | 3/2000 | Young ..................... 707/103 R |
| 6,047,289 | A | 4/2000 | Thorne et al. .................. 707/10 |
| 6,272,495 | B1 * | 8/2001 | Hetherington ............... 707/101 |
| 6,336,211 | B1 * | 1/2002 | Soe ............................ 717/108 |
| 6,360,230 | B1 * | 3/2002 | Chan et al. .............. 707/103 R |
| 6,370,542 | B1 | 4/2002 | Kenyon .................. 707/103 R |
| 6,405,220 | B1 | 6/2002 | Brodersen et al. ........... 707/202 |
| 6,446,077 | B2 | 9/2002 | Straube et al. ........... 707/103 Y |
| 6,591,272 | B1 | 7/2003 | Williams .................... 707/102 |
| 6,601,233 | B1 | 7/2003 | Underwood ................ 717/102 |

(Continued)

OTHER PUBLICATIONS

US Office Action dated Jan. 31, 2008, issued in U.S. Appl. No. 11/305,050, pp. 1-17.

(Continued)

*Primary Examiner*—Isaac M Woo
*Assistant Examiner*—Syling Yen
(74) *Attorney, Agent, or Firm*—Merchant & Gould PC (57) ABSTRACT

A dynamically configurable list management system that supports list elements of multiple content types is presented. Each list element is associated with an element type via an element type identifier. The element type identifier uniquely identifies the element type to the list management system. Each property associated with each element type is included in the list. Each property is identified by a unique property identifier. When adding a list element of a new element type to an existing list that does not include any elements of the new element type, the list management system identifies every property associated with the new element type. For each property associated with the new element type, the list management system determines which properties are not already included in the list, and adds those properties that are not already including to the list.

16 Claims, 6 Drawing Sheets

| Type ID | Title | Artist | Filename | File Size | Web Site Name | File Type |
|---|---|---|---|---|---|---|
| Song | When It's Over | Sugar Ray | When It's Over | 3,374 Kb | | Windows Media |
| Song | Every Morning | Sugar Ray | Every Morning | 3,393 Kb | | Windows Media |
| Song | Someday | Sugar Ray | Someday | 3,756 Kb | | Windows Media |
| Song | This Love | Maroon 5 | This Love | 3,178 Kb | | MP3 |
| Song | She Will Be ... | Maroon 5 | She Will Be ... | 3,951 Kb | | MP3 |
| Song | Sunday Morning | Maroon 5 | Sunday ... | 3,787 Kb | | Windows Media |
| Song | Clarity | John Mayer | Clarity | 4,182 Kb | | Windows Media |
| Song | Smooth | Santana | Smooth | 4,596 Kb | | Windows Media |
| Song | Love Shack | B 52s | Love Shack | 4,669 Kb | | MP3 |
| Image | | | Vacation_001 | 1,389 Kb | | Tiff image |
| Image | | | Vacation_002 | 1,268 Kb | | Tiff image |
| Image | | | Vacation_007 | 1,272 Kb | | Tiff image |
| Image | | | Vacation_026 | 1,391 Kb | | Tiff image |
| Image | | | Amber and Eric | 1,207 Kb | | Tiff image |
| Image | | | Andrew fishing | 843 Kb | | JPEG image |
| Image | | | Alex at meet_1 | 669 Kb | | JPEG image |
| Image | | | Alex at meet_2 | 578 Kb | | PNG image |
| URL | | | WelcomeMSN | 1 Kb | Welcome To MSN.com | URL Link |
| URL | | | CreativeLink | 1 Kb | Creativity.com Home ... | URL Link |
| URL | | | SeattleTimes | 1 Kb | Seattle Times Home ... | URL Link |
| URL | | | USPTOLink | 1 Kb | United States Patent ... | URL Link |
| URL | | | AmazoneFront | 1 Kb | Amazone.com: Welcome | URL Link |

U.S. PATENT DOCUMENTS

| | | | |
|---|---|---|---|
| 6,615,223 B1 | 9/2003 | Shih et al. | 707/201 |
| 6,754,885 B1 | 6/2004 | Dardinski et al. | 717/113 |
| 6,957,229 B1 | 10/2005 | Dyor | 707/103 X |
| 7,249,118 B2* | 7/2007 | Sandler et al. | 707/1 |
| 2002/0143521 A1* | 10/2002 | Call | 704/1 |
| 2003/0014442 A1 | 1/2003 | Shiigi et al. | 707/513 |
| 2003/0050937 A1* | 3/2003 | Lusen et al. | 707/104.1 |
| 2004/0019639 A1 | 1/2004 | E et al. | 709/205 |
| 2004/0267595 A1* | 12/2004 | Woodings et al. | 705/9 |
| 2005/0076036 A1 | 4/2005 | Le | 707/100 |
| 2005/0091192 A1* | 4/2005 | Probert et al. | 707/1 |
| 2005/0149582 A1 | 7/2005 | Wissmann et al. | 707/201 |
| 2006/0184507 A1* | 8/2006 | Lefferts et al. | 707/2 |
| 2006/0184571 A1* | 8/2006 | Liu et al. | 707/103 R |

OTHER PUBLICATIONS

US Office Action dated Nov. 12, 2008, issued in U.S. Appl. No. 11/305,050, pp. 1-22.

US Office Action dated May 11, 2009, issued in U.S. Appl. No. 11/305,050, pp. 1-25.

Office Action (Final) dated Nov. 13, 2009, issued in U.S. Appl. No. 11/305,050, pp. 1-23.

* cited by examiner

My Music List

| Title | Artist | Album | Genre | Length | Sampling |
|---|---|---|---|---|---|
| When It's Over | Sugar Ray | Sugar Ray | Rock | 3:38 | 128 Kbps |
| Every Morning | Sugar Ray | 14:59 | Rock | 3:39 | 128 Kbps |
| Someday | Sugar Ray | 14:59 | Rock | 4:03 | 128 Kbps |
| This Love | Maroon 5 | Songs About . | Rock | 3:26 | 128 Kbps |
| She Will Be ... | Maroon 5 | Songs About . | Rock | 4:17 | 128 Kbps |
| Sunday Morning | Maroon 5 | Songs About . | Rock | 4:06 | 128 Kbps |
| Clarity | John Mayer | Heavier ... | Rock | 4:32 | 128 Kbps |
| Smooth | Santana | Supernatural | Pop | 4:58 | 64 Kbps |

*Fig.1A.*

My Images

| Filename | File Size | Date Created | Color Depth | File Type |
|---|---|---|---|---|
| Vacation_001 | 1,389 Kb | 12/13/04 1:30 pm | 34 bit color | Tiff image |
| Vacation_002 | 1,268 Kb | 12/13/04 2:59 pm | 34 bit color | Tiff image |
| Vacation_007 | 1,272 Kb | 12/15/04 3:09 pm | 34 bit color | Tiff image |
| Vacation_026 | 1,391 Kb | 12/20/04 9:32 am | 34 bit color | Tiff image |
| Amber and Eric | 1,207 Kb | 9/17/03 4:42 pm | 34 bit color | Tiff image |
| Andrew fishing | 843 Kb | 7/15/03 12:34 pm | 24 bit color | JPEG ima. |
| Alex at meet_1 | 669 Kb | 10/17/04 11:30am | 24 bit color | JPEG ima. |
| Alex at meet_2 | 578 Kb | 10/17/04 11:30am | 16 bit grey | PNG ima.. |

*Fig.1B.*

My Bookmarks

| Web Site Name | URL | Last Visited |
|---|---|---|
| Welcome To MSN.com | Http://www.msn.com | 12/29/04 8:30.. |
| Creativity.com Home ... | Http://www.creativity.com | 10/17/04 7:59.. |
| Seattle Times Home Page | Http://www.seattletimes.com | 7/15/04 5:03 ... |
| United States Patent ... | Http://www.uspto.gov | 5/22/04 10:33 . |
| Amazone.com: Welcome | Http://www.amazon.com | 5/18/04 8:22 ... |
| World Sports Network | Http://www.worldsports.net | 1/2/04 9:11am |
| Everysite Search | Gopher://everysearch.gph | 12/28/03 7:37. |
| Alan Parson's Project ... | Hthts://www.app-fans.com | 12/15/03 4:24. |

*Fig.1C.*

My List Of Music, Images, and URL Bookmarks

| Type ID | Title | Artist | Filename | File Size | Web Site Name | File Type |
|---|---|---|---|---|---|---|
| Song | When It's Over | Sugar Ray | When It's Over | 3,374 Kb | | Windows Media |
| Song | Every Morning | Sugar Ray | Every Morning | 3,393 Kb | | Windows Media |
| Song | Someday | Sugar Ray | Someday | 3,756 Kb | | Windows Media |
| Song | This Love | Maroon 5 | This Love | 3,178 Kb | | MP3 |
| Song | She Will Be ... | Maroon 5 | She Will Be ... | 3,951 Kb | | MP3 |
| Song | Sunday Morning | Maroon 5 | Sunday ... | 3,787 Kb | | Windows Media |
| Song | Clarity | John Mayer | Clarity | 4,182 Kb | | Windows Media |
| Song | Smooth | Santana | Smooth | 4,596 Kb | | Windows Media |
| Song | Love Shack | B 52s | Love Shack | 4,669 Kb | | MP3 |
| Image | | | Vacation_001 | 1,389 Kb | | Tiff image |
| Image | | | Vacation_002 | 1,268 Kb | | Tiff image |
| Image | | | Vacation_007 | 1,272 Kb | | Tiff image |
| Image | | | Vacation_026 | 1,391 Kb | | Tiff image |
| Image | | | Amber and Eric | 1,207 Kb | | Tiff image |
| Image | | | Andrew fishing | 843 Kb | | JPEG image |
| Image | | | Alex at meet_1 | 669 Kb | | JPEG image |
| Image | | | Alex at meet_2 | 578 Kb | | PNG image |
| URL | | | WelcomeMSN | 1 Kb | Welcome To MSN.com | URL Link |
| URL | | | CreativeLink | 1 Kb | Creativity.com Home ... | URL Link |
| URL | | | SeattleTimes | 1 Kb | Seattle Times Home ... | URL Link |
| URL | | | USPTOLink | 1 Kb | United States Patent ... | URL Link |
| URL | | | AmazoneFront | 1 Kb | Amazone.com: Welcome | URL Link |

DYNAMICALLY CONFIGURABLE LISTS FOR INCLUDING MULTIPLE CONTENT TYPES

FIELD OF THE INVENTION

The present invention relates to managing lists of information on a computer, and more particularly, to a dynamically configurable list capable of including and managing multiple content types.

BACKGROUND OF THE INVENTION

Almost everyone that uses a computer, or some computing device, is familiar with a ubiquitous management tool called the list. Indeed, computer users maintain lists of e-mail contacts, URL bookmarks, music, digitized images, computer files, and the like, to name just a few. Using a list, a user can organize related items in useful ways. For example, a user can search or sort within a list of computer files for text, or the user can specify the order that certain songs will be played. With a list, a user can display, edit, and manipulate list items.

Unfortunately, as computer users are aware, lists are directed to homogenous items. In other words, while lists manage multiple list items, they manage multiple list items that are of a single type. For example, while a computer user may have lists of URL bookmarks, phone numbers, e-mail addresses, music, images, computer files, the computer user must manage each list separately, e.g., a list of phone numbers, a list of email addresses, a list of music, etc. Each list manages information of a single type.

As those skilled in the art will appreciate, each type of list item typically has various properties, many of which are unique to the type. In fact, in general, list items are included in a list because they share common properties, even though an individual list item's actual content is different. For example, FIGS. 1A, 1B, and 1C are pictorial diagrams illustrating typical displays of lists that may be found on any given computing system. In particular, FIG. 1A illustrates a music list 100 of music/songs available on a computing device. As is common with the display of list times, music list 100 is shown in a tabular format, with columns representing the various properties of each item type. For example, with reference to FIG. 1A, the list of music 100 includes at least six properties, including Title 102, Artist 104, Album 106, Genre 108, Length 110, and Sampling Rate 112. Each row in the list represents an item in the list. For example, the row included in box 114 represents a single song, and displays the title of the song, its artist, the album on which it is found, as well as the song's genre, length, and sampling rate.

FIG. 1B illustrates an image list 130 of images/pictures available on the computer. Images in the image list 130 all have common properties including Filename 132, File Size 134, Date Created 136, Color Depth 138, File Type 138, and the like. Similarly, bookmarks in the bookmark list 160 of FIG. 1C each have common properties, including Web Site Name 162, URL 164, Date Last Visited 166, and the like.

As mentioned above, lists are currently designed include only items of a single type. As can be seen by comparing FIGS. 1A, 1B, and 1C, this is due in large part to the fact that one list type does not share all, if any, properties with another type. However, in many instances, it would be useful to be able to include items of separate types into a single list. Indeed, what is needed is a list management system that is dynamically configurable, such that list items of different types may be included in a single list. The present invention addresses these and other limitations that exist in the prior art.

SUMMARY OF THE INVENTION

In accordance with aspects of the present invention, a list management system, implemented on a computing device, for managing a list of a plurality of elements comprising elements of a plurality of element types, is presented. The list management system, upon receiving instructions to include at least one list element of a new element type not already included in the list, determines the properties of the new element type. For each property of the new element type not already included in the list, the system adds that property to the list. The list management system then adds at least one list element of the new element type to the list.

In accordance with further aspects of the present invention, a method, implemented on a computing device, for adding a list element of a new element type to an existing list comprising elements not of the new element type, is presented. An instruction to add a list element to the existing list is received. The properties of the new element type are determined. For each property of the new element type not already included in the list, that property is added to the list. After adding all properties not previously included in the list, the list element of the new element type is added to the list.

In accordance with yet further aspects of the present invention, a computer-readable medium bearing computer-executable instructions which, when executed on a computing device, carry out a method for adding a list element of a new element type to an existing list comprising elements not of the new element type, is presented. An instruction to add a list element to the existing list is received. The properties of the new element type are determined. For each property of the new element type not already included in the list, that property is added to the list. After adding all properties not previously included in the list, the list element of the new element type is added to the list.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A, 1B, and 1C are pictorial diagrams illustrating typical displays of lists that may be found on a computing system;

DETAILED DESCRIPTION

As mentioned above, according to aspects of the present invention, a dynamically configurable list capable of including multiple list types is presented. In order to include disparate list types within a single list, for each list element in a list, a corresponding element type is also included. In one embodiment, the element type is a unique value corresponding to a particular list element.

Figure 2:
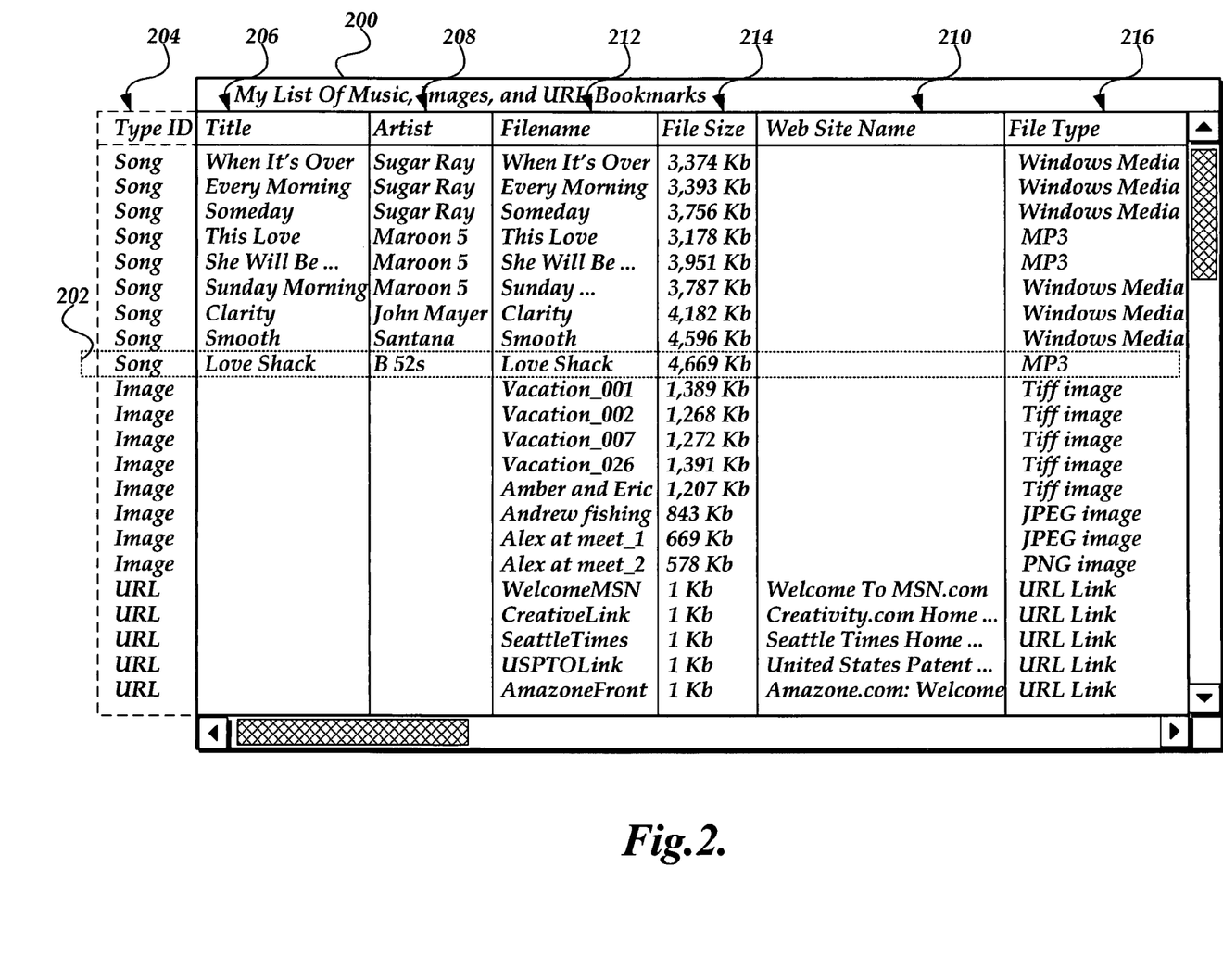
FIG. 2 is a pictorial diagram illustrating the display of an exemplary list formed in accordance with the present invention.

In various embodiments, a list may include the element type as a list attribute. Alternatively, the element type may be a value simply associated with the list element. Similarly, the element type may be displayed to the user as a list type property. FIG. 2 is a pictorial diagram illustrating an exemplary dynamically configurable list capable of including disparate list element types.

FIG. 2 is a pictorial diagram illustrating the display of an exemplary list 200 formed in accordance with the present invention. The exemplary list 200 includes list elements of three types: music, images, and URL Bookmarks. As indicated above, each element in the list 200, such as element 202, is associated with an element type. As mentioned above and illustrated in FIG. 2, element types may be included as part of the list 200 as an element property, such as hidden element property type 204. It should be noted that while the element types shown in the type column 204 are displayed as text strings, it is illustrative only and should not be construed as limiting the present invention. As an example, if the type is displayed, it is only a textual representation of the underlying unique type identifier.

Those skilled in the art will appreciate that, in the prior art, lists have relied upon the fact that elements in the list were all of the same type, and thus, all shared type attributes common to that type. Thus, in their display, each element had a value for each type attribute. In contrast, the present invention combines the attributes of all included element types into its list of attributes. Clearly, all list elements may not have values for each attribute. For example, as shown in FIG. 2, which illustrates a list that combines music, images, and URL Bookmarks, not all list elements include values for various attributes, including Title 206, Artist 208, and Web Site Name 210. In displaying a multi-type list, such as list 200, where an individual element has a value corresponding to an attribute, such as with attributes Filename 212, File Size 214, and File Type 216, a value is typically displayed.

Figure 3:
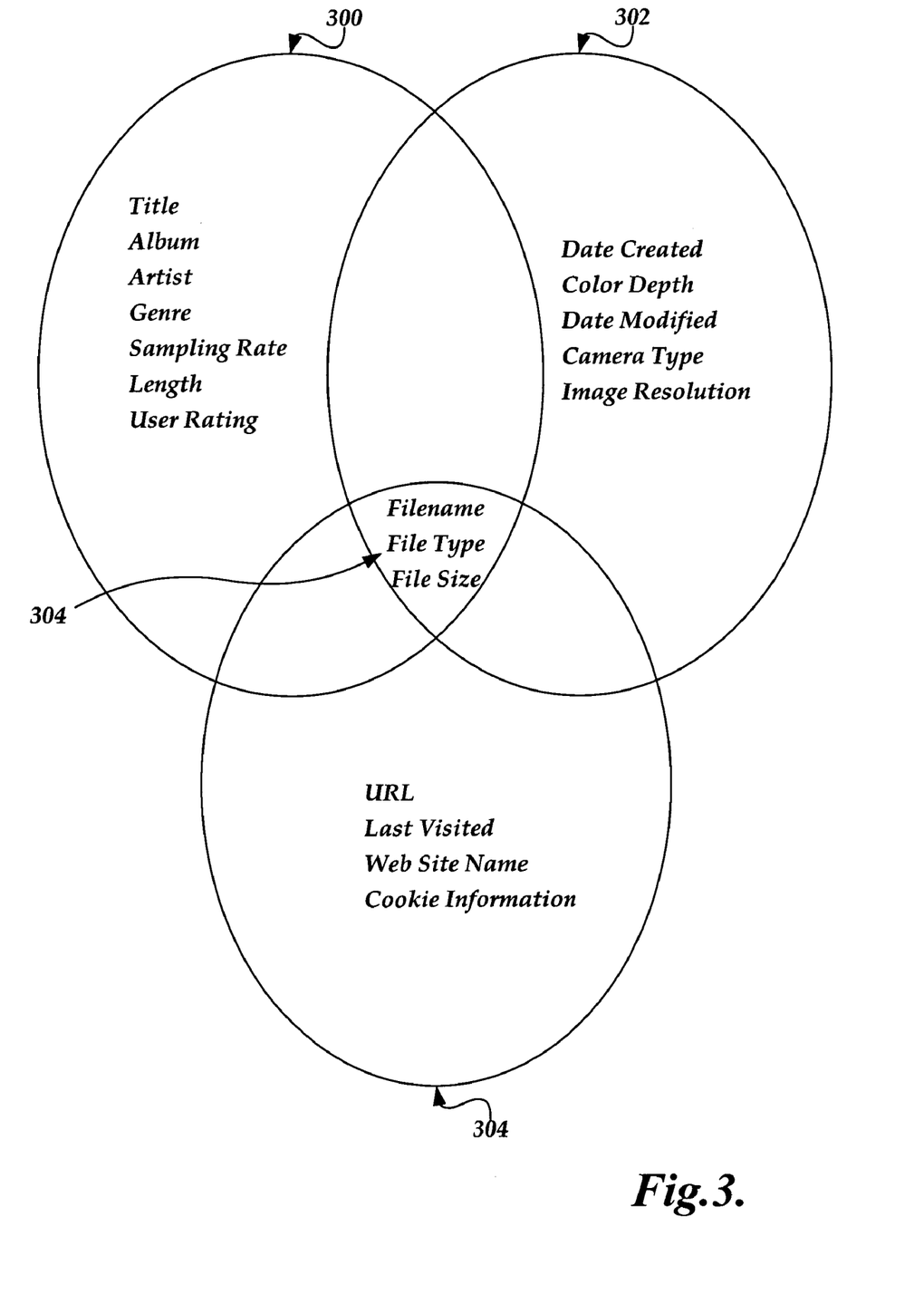
FIG. 3 is a pictorial diagram for illustrating the union of element attributes.

According to aspects of the present invention, when adding an element type to a list, the list performs a union of type attributes, adding the type attributes of the newly added element type to those already existing in the list. For example, FIG. 3 is a pictorial diagram that illustrates the union of element attributes. Each oval identifies type attributes associated with the list type. In particular, oval 300 identifies exemplary music attributes, including, but not limited to, Title, Album, Artist, Genre, Sampling Rate, Length, User Rating, File Type, File Size, and Filename. Oval 302 identifies exemplary image attributes, including, but not limited to, Creation Date, Modification Date, Color Depth, Camera Type, Image Resolution, File Type, File Size, and Filename. Similarly, oval 304 identifies exemplary URL Bookmark attributes, including, but not limited to, URL, Web Site Name, Date Last Visited, Cookie Information, File Type, File Size, and Filename.

As can be seen from this diagram, while there are many type attributes that are not shared among the types, there are some, i.e., those attributes found in the intersection 306 of the ovals, that are shared among the types. It is for these type attributes that a list may display values of all types of list elements. Thus, if the list already includes music elements, and was then expanded to include image elements, image elements Creation Date, Modification Date, Color Depth, Camera Type, and Image Resolution would be added to the list, while File Type, File Size, and Filename would not as they already exist within the list.

According to one embodiment of the present invention, a user must first associate an element type with an existing list, prior to adding elements of that type to the list. However, in an alternative embodiment, an element type may be added to the list when an element of that type is first added.

Figure 4:
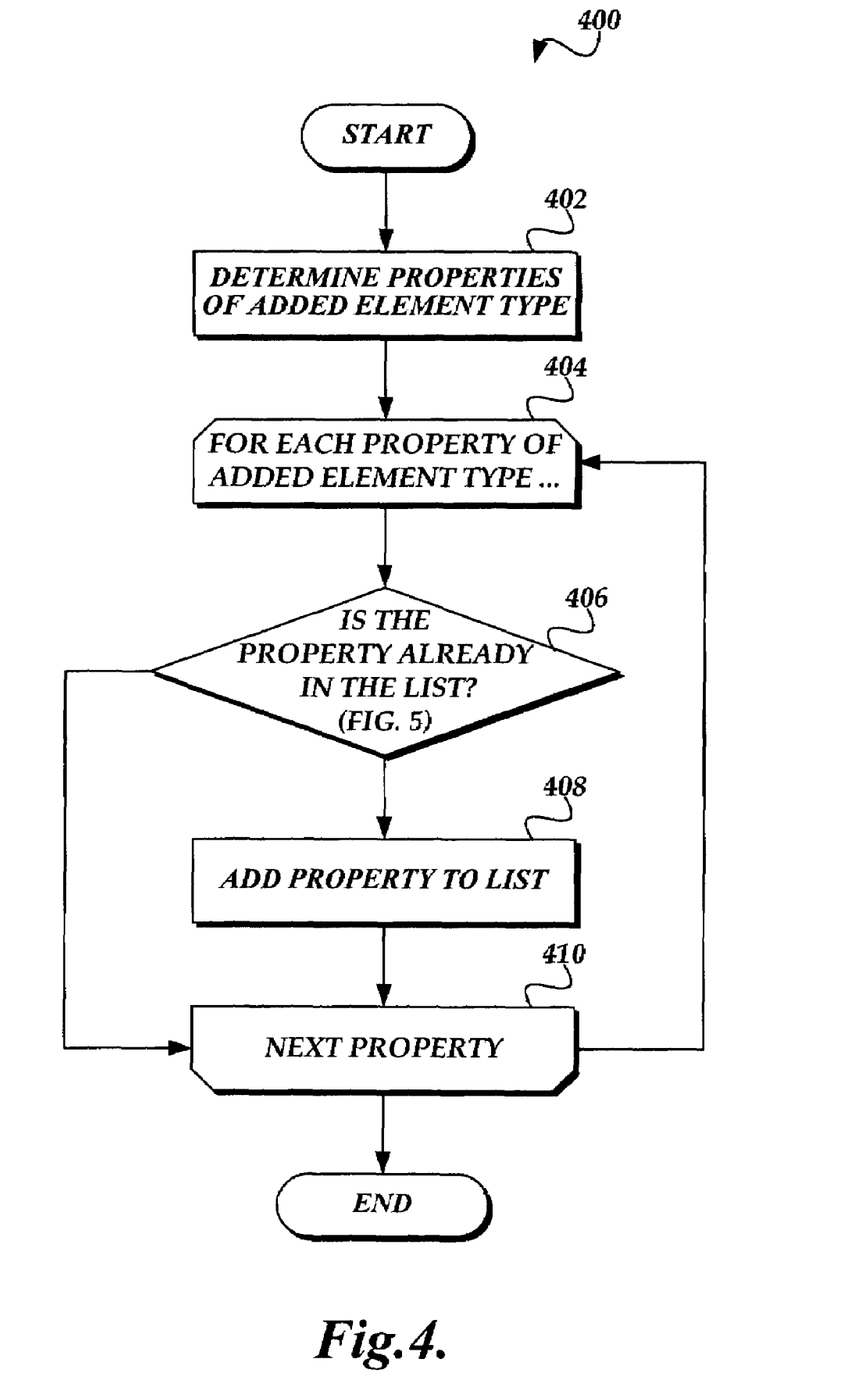
FIG. 4 is a flow diagram implemented in the list management system, illustrating an exemplary routine for adding a new element type to an existing list.

In regard to adding new element types to an existing list, FIG. 4 is a flow diagram implemented in the list management system, illustrating an exemplary routine 400 for adding the new element type to the existing list. Beginning at block 402, the properties of the new element type are determined. While not shown, in an alternative embodiment, those skilled in the art will appreciate that rather than determining all of the element type properties at the beginning of the exemplary routine 400, the element type properties may be determined during the processing of the routine, i.e., during the subsequent "for loop" where each property is examined.

At looping block 404, the above mentioned "for loop" is commenced to iterate through each property of the new element type. As such, the first property of the element type is selected. At decision block 406, a determination is made as to whether the selected property already exists within the list. Determining whether the selected property already exists within the list is described in greater detail below in regard to FIG. 5.

If the property does not already exist within the list, at block 408, the property is added to the list, i.e., the list's properties are expanded for each element to include this property. Of course, as discussed earlier, not all list elements will have a value corresponding to this property. After adding the property to the list, or, alternatively, if the property already exists within the list, the routine 400 proceeds to loop block 410.

At loop block 410, the end of the "for loop" is reached. Thus, as those skilled in the art will appreciate, in accordance with this type of looping structure, the routine 400 either selects another property if there are more to select, thereby returning to the start of the "for loop" block 406, or continues execution outside of the loop. In this case, continuing beyond the "for loop" means that the routine 400 has completed its purpose, and the exemplary routine terminates.

In regard to determining whether a potentially new (selected) property already exists in the list, as mentioned above, FIG. 5 is a flow diagram illustrating an exemplary subroutine 500 for determining whether the potentially new property already exists in the list. Beginning at block 502, a determination is made regarding whether the selected property is already in the list according to the selected property's unique identifier, i.e., its type identifier described above with reference to FIG. 2. If there is a match between the selected property's unique identifier and a property already existing within the list's system, the exemplary subroutine 500 returns an affirmation that the selected property already exists in the list.

Figure 5:
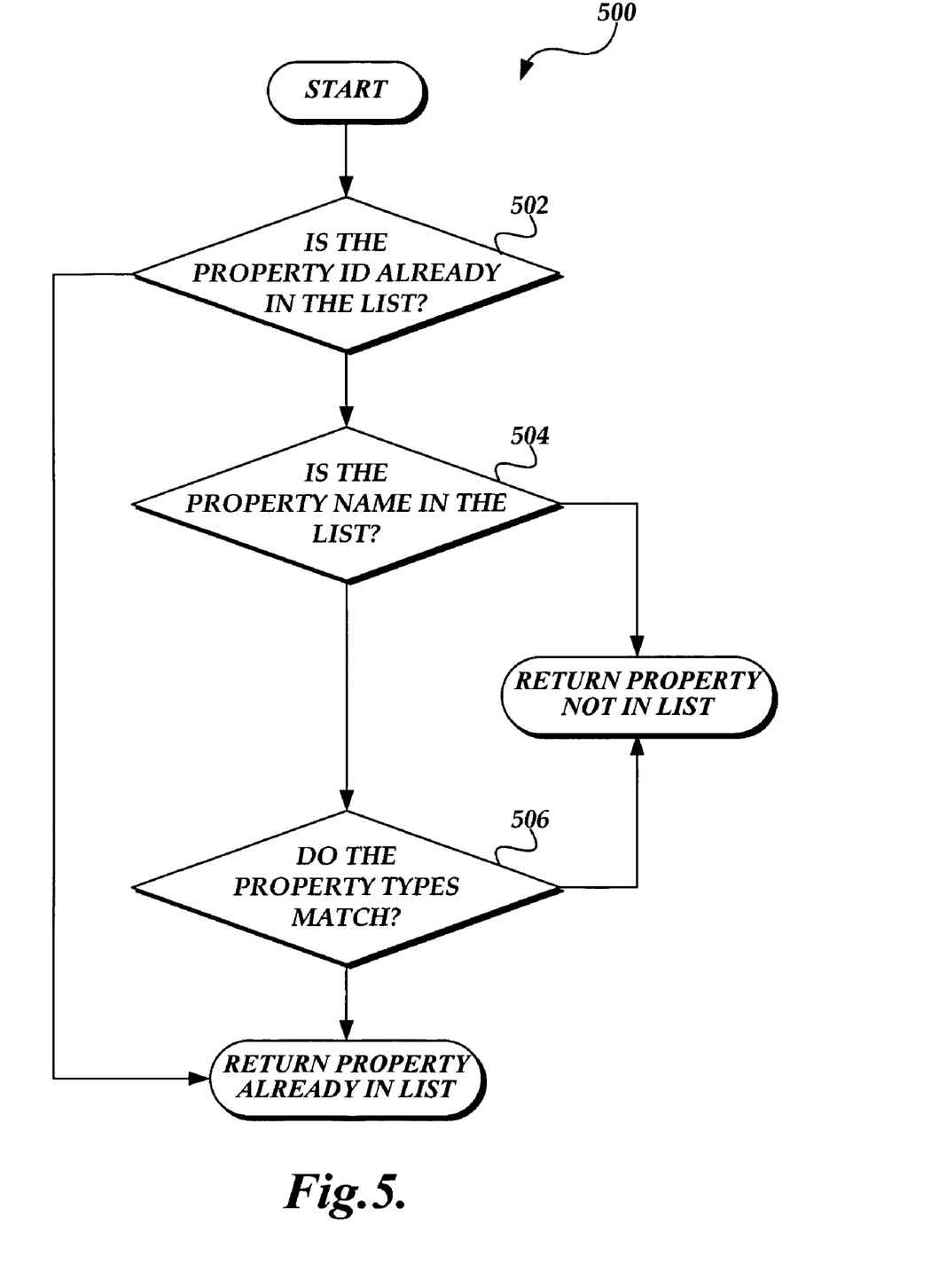
FIG. 5 is a flow diagram illustrating an exemplary subroutine for determining whether a potentially new property already exists in an existing list.

Even when there is not an exact match with the selected property's identifier, there may be instances when the selected property and an existing property are so similar that they should be considered a match. Unfortunately, while some element type properties may superficially appear to be the same, they are not. To illustrate, assume that the image types described above included an attribute called "Album." Superficially, it may appear that the "Album" property for the music element type is sufficiently the same as the "Album" property for the image element type and could/should be considered a match. However, if the image element property "Album" corresponds to a system command executing a computer program that maintains image albums, it could be confusing to a user to display a music element "Album" property in the same column as an image element "Album" property. Accordingly, when deciding on whether an attribute of a list type already exists among the list attributes, an additional determination must occur (when the property type identifier does not match). Thus, at decision block 504, a determination is made as to whether the selected property's name matches to a property already existing in the list. If there is no match, the routine 500 returns without including the selected properties in the list.

If the selected property's name matches a property name already existing in the list, at decision block 506, an additional determination is made as to whether the selected property's type matches the potentially matching property already existing in the list. In other words, if the names match, an additional determination is made to ensure that the type of property is the same before concluding that the property is already in the list. Types of properties may include, but are certainly not limited to, text strings, numerical values, enumerated types, floating point values, and the like. If the property types match, the exemplary subroutine 500 returns an affirmative indication that the selected property already exists in the list. Alternatively, if the property types do not match, the exemplary subroutine 500 returns a negative indication that the selected property does not exist in the list.

As can be seen from the description above, in order for a list to effectively manage elements of multiple types, the list must be able to identify the element's properties and determine whether they exist within its management system. According to aspects of the present invention, each element type property is associated with a unique identifier. Element type properties also typically include property names and value properties, i.e., whether the corresponding value is a text string, a character, a numeric value, or the like. Property information, such as property name and value type, can be maintained and modified by a user when defining an element type. Typically, however, the element type identifier is generated and maintained by the list system.

Figure 6:
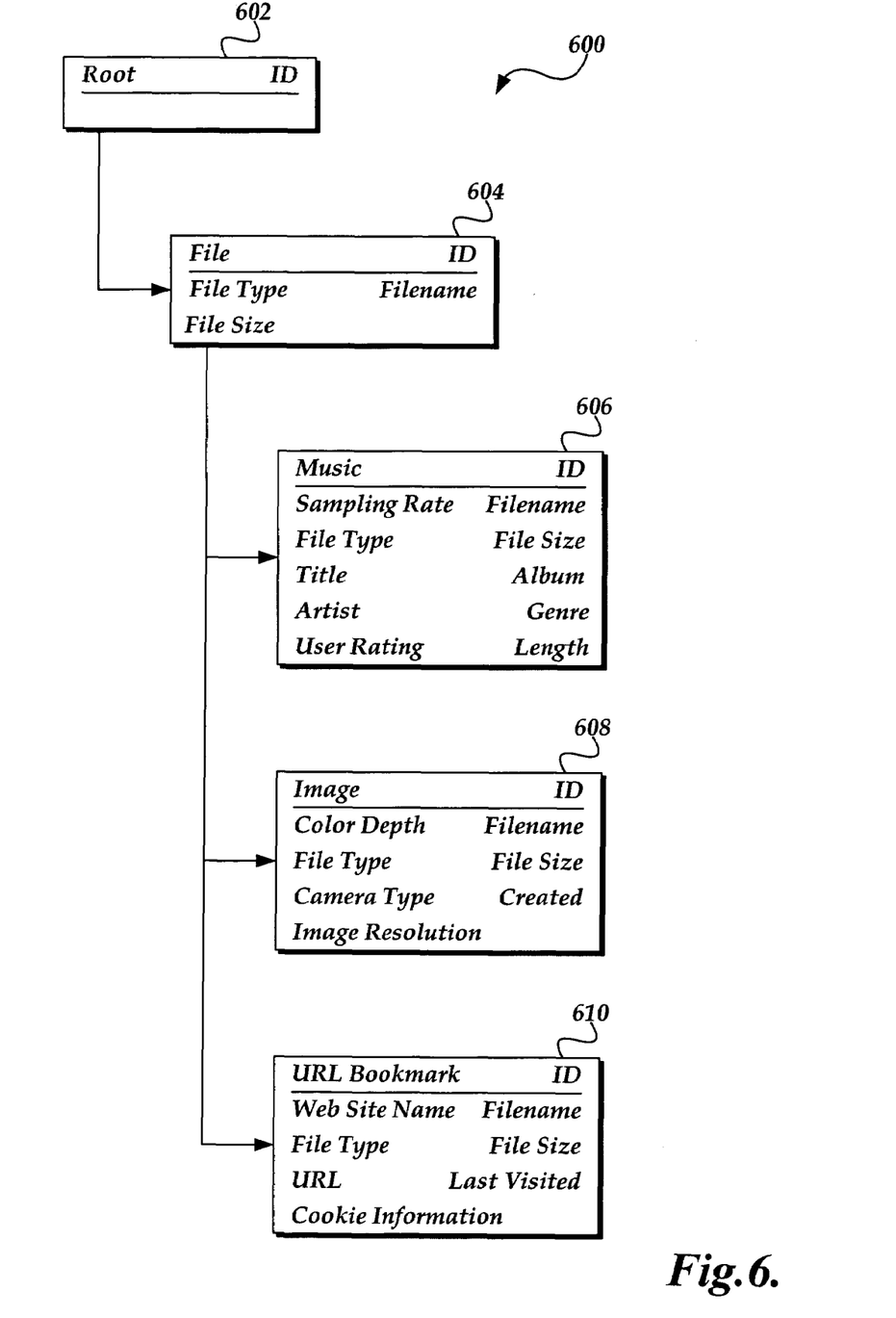
FIG. 6 is a pictorial diagram illustrating a hierarchical organization of list element types.

According to one embodiment of the present invention, the list management system utilizes a hierarchical organization to maintain list element types, as well as properties for each list element type. FIG. 6 is a pictorial diagram illustrating a hierarchical organization 600 of list element types. At the top of the hierarchical organization is a root type 602. Typically, the root element type is a read-only type and is used to create child element types. As shown in FIG. 6, the root type includes a type identifier (ID). As can be seen, the root type does not necessarily have any properties associated with it. This root type serves as a template for child types. However, unlike the inheritance concept found in most object-oriented programming languages, the inheritance of parent to child type is not strictly enforced.

Child element types are created/established based on the parent type, i.e., including the same properties or attributes as the parent. Thus, the file type 604, being a child of the root type 602, initially includes all properties of the parent (which, in this case, does not have properties). Additionally, as can be seen, file type properties have been added, namely File Type, Filename, and File Size.

From the file element type 604 are three children element types, namely a Music type 606, an Image type 608, and a URL Bookmark type 610. As can be seen, each child type is initially created with the properties and attributes of the parent type, and has additional properties added. While this diagram illustrates only a few levels of "inheritance," it should be appreciated that each defined type may be the parent of yet another child element type.

As mentioned above, according to aspects of the present invention, inheritance of parent to child type is not strictly enforced. What this means is that while a child element type is initially created with all the properties/attributes of the parent element type, a user is free to configure the child element type in whatever manner that seems suitable. For example, a user may wish to remove the inherited property "File Type" from the URL Bookmark element type 610. As those skilled in the art will then recognize, this is very much unlike inheritance from object-oriented programming. More particularly, in object-oriented programming, one can override the functionality of an inherited property or attribute, but you cannot remove that attribute. In contrast, the present invention may, in most instances, permit one to remove an inherited property. Clearly, this is a substantial departure from the typical inheritance paradigm associated with object-oriented programming.

In order to enforce inheritance, such as found in object-oriented programming, according to the present invention, properties in each element type may be locked. By locking a property, child element types that are created after that property is locked must include that property and a user cannot remove or modify the property without unlocking that property at the appropriate parent element type. However, locking a property alone does not affect currently existing child element types. Thus, if a user were to configure the File type 604 such that the property File Type were locked, and assuming that the URL Bookmark element type 610 were already existing, that user would be able to delete the File Type property. In order to ensure that, when properties are locked, such modifications are propagated down the hierarchy chain, a push instruction must be given by the user. A push instruction forces the existing children to accept the pushed modifications. It should be noted that a push instruction could be utilized without locking a particular property. For example (not shown), if a user added a Foo property to element File type 604, the user could then issue a push instruction which would propagate the Foo property throughout the inheritance chains to the children element types. However, without first locking that Foo property, a user could subsequently remove that Foo property from any particular child element type.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

The embodiments of the invention in which an exclusive property or privilege is claimed are defined as follows:

1. A computer-implemented list management system for managing a list of a plurality of elements, the list comprising elements of a plurality of element types, each element having at least one property associated with a property name, a property type, and a value, wherein the list management system, upon receiving instructions to accept an element of a new element type not already included in the list of elements:

determines one or more properties of the new element type, each of the one or more properties of the new element type including a property name and a property type;

determines whether the one or more property names of the new element type are already included in the list;

for each of the one or more properties of the new element type having a property name not already included in the list, adds the property to the list, wherein when the property is added to the list, the property is also added as a new property for each of the plurality of elements of the list;

for each of the one or more properties of the new element type having a property name already included in a corresponding property of an existing element of the list, determines whether the property type for such property of the new element type matches the property type associated with the corresponding existing element of the list, and, if not, adds such property of the new element type to the list, including added such property as a new property for each of the plurality of elements of the list;

adds at least one property of existing elements of the list as a new property for the new element type; and displays the list including at least some of the plurality of elements with at least some of the properties of the list available to each element in the list.

2. The list management system of claim 1, wherein each element in the list is associated with its element type by a element type identifier that uniquely identifies its element type.

3. The list management system of claim 2, wherein each property is associated with a unique property identifier.

4. The list management system of claim 3, wherein the list management system is configured to accept elements of the new element type prior to adding an element of the new element type to the list.

5. The list management system of claim 3, wherein the list management system is configured to accept elements of the new element type upon adding an element of the new element type to the list.

6. The system of claim 1, wherein property type comprises at least one of: text string, numerical value, enumerated type, or floating point value.

7. A method, implemented on a computing device, for adding a new element type to an existing list of elements not of the new element type, the method comprising:

receiving an instruction to add the new element type to the existing list of elements, wherein each existing element of the list of elements has one or more properties associated with a property name, a property type, and a value;

determining one or more properties of the new element type, each of the one or more properties of the new element type including a property name and a property type;

determining whether the one or more property names of the new element type are already included in the list;

for each of the one or more properties of the new element type having a property name not already included in the list, adding that property of the new element type to the list and adding that property as a new property for each of the existing elements of the list;

for each of the one or more properties of the new element type having a property name already included in a corresponding property of one of the existing elements of the list, determining whether the property type for such property of the new element type matches the property type associated with the corresponding existing element of the list, and, if not, adding such property of the new element type to the list, including adding such property as a new property for each of the plurality of existing elements of the list;

adding one or more properties of the existing elements of the list as new properties of the new element type; and displaying the existing list including the newly added element type and the newly added properties.

8. The method of claim 7, wherein each list element in the existing list is associated with an element type by an element type identifier that uniquely identifies its element type.

9. The method of claim 8, wherein each property is associated with a unique property identifier.

10. The method of claim 8, wherein the new element type is added to the existing list prior to accepting an element of the new element type to the existing list.

11. The method of claim 8, wherein the new element type is added to the existing list upon accepting an element of the new element type to the existing list.

12. A computer storage medium bearing computer-executable instructions which, when executed on a computing device, carry out a method for adding a list element of a new element type to an existing list comprising existing elements not of the new element type, each element in the existing list having at least one property associated with a value, the method comprising:

receiving an instruction to add the list element of the new element type to the list of existing elements, wherein each element of the list of existing elements has one or more properties associated with a property name, a property type, and a value;

determining properties of the new element type, each of the one or more properties of the new element type including a property name and a property type;

for each property of the new element type having a property name not already included in the list, adding the property to the list and adding the property as a new property for each of the existing elements of the list;

for each of the one or more properties of the new element type having a property name already included in a corresponding property of one of the existing elements of the list, determining whether the property type for such property of the new element type matches the property type associated with the corresponding existing element of the list, and, if not, adding such property of the new element type to the list, including adding such property as a new property for each of the plurality of existing elements of the list;

adding the list element of the new element type to the existing list and adding the properties of the existing elements of the list as new properties for the list element of the new element type; and displaying the existing list including at least some of the elements of the list with at least some of the properties of the list available to each element in the list.

13. The method of claim 12, wherein each list element in the list is associated with an element type by an element type identifier that uniquely identifies the element type.

14. The method of claim 13, wherein each property is associated with a unique property identifier.

15. The method of claim 14, wherein the new element type is added to the existing list prior to accepting an element of the new element type to the list.

16. The method of claim 14, wherein the new element type is added to the existing list upon accepting an element of the new element type to the list.

* * * * *

UNITED STATES PATENT AND TRADEMARK OFFICE
CERTIFICATE OF CORRECTION

| | | |
|---|---|---|
| PATENT NO. | : 7,653,653 B2 | Page 1 of 1 |
| APPLICATION NO. | : 11/058096 | |
| DATED | : January 26, 2010 | |
| INVENTOR(S) | : Robert G. Lefferts et al. | |

It is certified that error appears in the above-identified patent and that said Letters Patent is hereby corrected as shown below:

In column 7, line 11, in Claim 1, delete "added" and insert -- adding --, therefor.

Signed and Sealed this
Eighth Day of February, 2011

David J. Kappos
*Director of the United States Patent and Trademark Office*